United States Patent
Zhang et al.

(10) Patent No.: US 12,350,951 B2
(45) Date of Patent: Jul. 8, 2025

(54) OPTICAL ANTI-COUNTERFEITING ELEMENT AND ANTI-COUNTERFEITING PRODUCT

(71) Applicants: ZHONGCHAO SPECIAL SECURITY TECHNOLOGY CO., LTD, Beijing (CN); CHINA BANKNOTE PRINTING AND MINTING CORP., Beijing (CN)

(72) Inventors: Baoli Zhang, Beijing (CN); Kai Sun, Beijing (CN); Weiwei Zhang, Beijing (CN); Jun Zhu, Beijing (CN)

(73) Assignees: ZHONGCHAO SPECIAL SECURITY TECHNOLOGY CO., LTD, Beijing (CN); CHINA BANKNOTE PRINTING AND MINTING CORP, Beijing (CN)

( * ) Notice: Subject to any disclaimer, the term of this patent is extended or adjusted under 35 U.S.C. 154(b) by 503 days.

(21) Appl. No.: 17/754,342

(22) PCT Filed: Aug. 18, 2020

(86) PCT No.: PCT/CN2020/109666
§ 371 (c)(1),
(2) Date: Mar. 30, 2022

(87) PCT Pub. No.: WO2021/063121
PCT Pub. Date: Apr. 8, 2021

(65) Prior Publication Data
US 2022/0339957 A1    Oct. 27, 2022

(30) Foreign Application Priority Data
Sep. 30, 2019    (CN) .......................... 201910945159.3

(51) Int. Cl.
*B42D 25/324*    (2014.01)
*B42D 25/328*    (2014.01)
(Continued)

(52) U.S. Cl.
CPC ............. *B42D 25/328* (2014.10); *G02B 5/04* (2013.01); *B42D 25/324* (2014.10); *B42D 25/351* (2014.10)

(58) Field of Classification Search
CPC ............................... B42D 25/324; G02B 5/04
See application file for complete search history.

(56) References Cited

U.S. PATENT DOCUMENTS

| | | | | |
|---|---|---|---|---|
| 5,687,012 | A * | 11/1997 | Kang .................. | G06K 19/16 359/10 |
| 2004/0206920 | A1 * | 10/2004 | Wilson .............. | G06K 7/10702 250/556 |
| 2017/0242263 | A1 * | 8/2017 | Raymond ........... | B42D 25/324 |

FOREIGN PATENT DOCUMENTS

| | | |
|---|---|---|
| CN | 101137514 A | 3/2008 |
| CN | 101516634 A | 8/2009 |

(Continued)

OTHER PUBLICATIONS

DE-102010048262-A1 English Translation (Year: 2012).*
(Continued)

*Primary Examiner* — Kyle R Grabowski
(74) *Attorney, Agent, or Firm* — Shumaker, Loop & Kendrick, LLP; James D. Miller (57) ABSTRACT

Provided are an optical anti-counterfeiting element and an anti-counterfeiting product. The optical anti-counterfeiting element comprises: a substrate, which comprises a first surface and second surface that are opposite one another, and a surface micro-structure layer that is formed on at least part of the first surface of the substrate. At least part of the surface micro-structure layer comprises a first set of at least (Continued)

a micro-prism, and the micro-prism is simultaneously provided with a refractive and a reflective function. Each pixel of a first pattern corresponds to one or more micro-prism refractive illumination spots in the first set of micro-prisms. The described optical anti-counterfeiting element can provide various anti-counterfeiting effects and improve the anti-counterfeiting performance of the anti-counterfeiting element.

14 Claims, 6 Drawing Sheets

(51) Int. Cl.
*G02B 5/04* (2006.01)
*B42D 25/351* (2014.01)

(56) References Cited

FOREIGN PATENT DOCUMENTS

| CN | 101767511 A | 7/2010 | | |
| CN | 103260893 A | 8/2013 | | |
| CN | 103687730 A | 3/2014 | | |
| CN | 103847289 A | 6/2014 | | |
| CN | 103963510 A | 8/2014 | | |
| CN | 104797430 A | 7/2015 | | |
| CN | 104837640 A | 8/2015 | | |
| CN | 103847289 B | 3/2016 | | |
| CN | 108693582 A | 10/2018 | | |
| CN | 108790469 A | 11/2018 | | |
| CN | 109895526 A | 6/2019 | | |
| DE | 102010048262 A1 | * | 4/2012 | ............ B42D 25/29 |
| JP | 2004209940 A | | 7/2004 | |
| JP | 2014168927 A | | 9/2014 | |
| JP | 2018081248 A | | 5/2018 | |
| JP | 2018183961 A | | 11/2018 | |
| WO | WO-2007137744 A2 | * | 12/2007 | ............ B42D 25/29 |
| WO | WO-2012055505 A1 | * | 5/2012 | ............ B42D 25/00 |
| WO | 2016065331 A2 | | 4/2016 | |
| WO | 2016065331 A3 | | 8/2016 | |
| WO | 2018135638 A1 | | 7/2018 | |
| WO | WO-2019063778 A1 | * | 4/2019 | ............ B42D 25/23 |
| WO | WO-2019063779 A1 | * | 4/2019 | ........... B42D 25/324 |

OTHER PUBLICATIONS

WO-2012055505-A1 English Translation (Year: 2012).*
The search report of counterpart EP application No. 20870675.4 issued on Aug. 28, 2023.
The search report of first office action of counterpart CN application No. 201910945159.3 issued on Nov. 23, 2021.

* cited by examiner

OPTICAL ANTI-COUNTERFEITING ELEMENT AND ANTI-COUNTERFEITING PRODUCT

CROSS-REFERENCE TO RELATED APPLICATION

This application is a U.S. national phase patent application of PCT/CN2020/109666 filed Aug. 18, 2020, which claims priority to Chinese Patent Application No. 201910945159.3, filed to the China National Intellectual Property Administration on Sep. 30, 2019, the disclosures of which are hereby incorporated herein by reference in their entirety.

TECHNICAL FIELD

The disclosure relates to the field of anti-counterfeiting technologies, and specifically, to an optical anti-counterfeiting element and an anti-counterfeiting product.

BACKGROUND

In order to prevent counterfeiting by means of scanning and copying, the holographic anti-counterfeiting technology is widely used as a solution for the optical anti-counterfeiting technology in various high-security or high value-added printed materials such as banknotes, identification cards, and product packaging, and has achieved an excellent effect.

At the end of the last century, with the development of computer science and image processing technologies, the holographic anti-counterfeiting technology has entered the era of digital development. One of the most important achievements is the successful application of the digital technology to the production of holograms. The comprehensive utilization of various technologies and devices such as a holography technology, a computer control system, a spatial light modulation device, and an image processing technology makes it possible to automatically photograph "dot matrix" holograms, so that digital composite holograms emerge as the times require. How to make digital holograms with large field of view and full parallax has become one of the hotspots of the holographic anti-counterfeiting technology all over the world. The specific effect of the full parallax image means that the human eye can see the content of the image within any observing angle range that is at an acute angle to the normal direction of the observed plane, and the content of the image corresponding to different angles is different, that is, binocular parallax within the full angle range. The full parallax anti-counterfeiting technology is one of the development directions of the current frontline public optical anti-counterfeiting technology.

Another type of the currently used holographic technology is to use the diffraction effect of patterned holographic micro-structures, to regulate and control a diffraction light field of the incident single-wavelength light (for example, blue corresponding to a single-wavelength laser with a wavelength of 405 nm), so as to realize the patterned reproduction pattern, so that the reproduction pattern is presented on a target carrier (surfaces such as a wall or a paper and the like) that can carry an image in a transmitted light direction or a reflected light direction. Such technology is one of the main means of the current second-line hidden optical anti-counterfeiting technology. However, such technology has the following limitations: (1) an incident light source must be monochromatic, otherwise no image can be reproduced; (2) a monochromatic laser light source is difficult to obtain, and as the laser is easy to cause irreversible burns of the fundus, an identification process of the light source has a high risk; (3) the technology is single in effect, and cannot implement a plurality of reproduction patterns in a same area; and (4) since diffractive micro-structures are easy to obtain, the technology lacks uniqueness, and an effectively anti-counterfeiting effect is hard to achieve.

SUMMARY

Some embodiments of the disclosure provide an optical anti-counterfeiting element and an anti-counterfeiting product, to resolve or at least partially resolve the above technical problems.

In order to implement of the above objective, an embodiment of the disclosure provides an optical anti-counterfeiting element. The optical anti-counterfeiting element includes: a substrate, comprising a first surface and a second surface that are opposite to each other; and a surface micro-structure layer, formed on at least a part of the first surface of the substrate. At least part of the surface micro-structure layer includes a first set of a micro-prism. The micro-prism has refractive and reflective functions simultaneously. Each pixel of a first pattern corresponds to refractive illumination spots of one or more micro-prisms in the first set of the micro-prism, so that: when the optical anti-counterfeiting element is irradiated on a first side of the optical anti-counterfeiting element, the refractive illumination spots of the first set of the micro-prism form the first pattern on a receiving carrier in a plane at a first distance from the second surface; when the optical anti-counterfeiting element is irradiated on a second side of the optical anti-counterfeiting element, the refractive illumination spots of the first set of the micro-prism form the first pattern on a receiving carrier in a plane at a second distance from the first surface; and a virtual image of the first pattern is observed on the first side and the second side of the optical anti-counterfeiting element, the first side is a side at which the first surface is located, and the second side is a side at which the second surface is located.

Another embodiment of the disclosure provides an anti-counterfeiting product having the optical anti-counterfeiting element.

The optical anti-counterfeiting element provided in the embodiments of the disclosure can provide various anti-counterfeiting effects and improve the anti-counterfeiting performance of the anti-counterfeiting element. Specifically, the optical anti-counterfeiting element provided in the embodiments of the disclosure has the following advantages.

(1) When the optical anti-counterfeiting element is irradiated on one side of the optical anti-counterfeiting element, a reproduced pattern can be observed by using the receiving carrier at a specific distance of the other side.

(2) An incident light source for irradiating the optical anti-counterfeiting element is easy to obtain, and safe and reliable. For example, the incident light source may be white light (a light source at any visible wavelength band), or may be a single-wavelength light source.

(3) When the optical anti-counterfeiting element is irradiated or is under ambient light, the human eyes can directly and respectively observe floating or sunken virtual images of a pattern compared with a surface of the optical anti-counterfeiting element from two sides, and a relationship between the floating virtual image and the sunken virtual image observed on the two sides of the optical anti-counterfeiting element is opposite.

Other features and advantages of the embodiments of the disclosure will be described in detail in the specific implementations below.

BRIEF DESCRIPTION OF THE DRAWINGS

The accompanying drawings are used to provide a further understanding of the embodiments of the disclosure, and constitute a part of the specification, which are used to explain the embodiments of the disclosure with the following specific implementations, and do not constitute a limitation of the embodiments of the disclosure. In the drawings:

FIG. 1b to FIG. 1e are schematic diagrams showing anti-counterfeiting characteristics of the optical anti-counterfeiting element shown in FIG. 1a.

DETAILED DESCRIPTION OF THE EMBODIMENTS

An optical anti-counterfeiting element and an anti-counterfeiting product having the optical anti-counterfeiting element according to the implementations of the disclosure are described in detail below with reference to the drawings. It should be understood that, the drawings and detailed description are merely illustrative of preferred embodiments of the disclosure, and are not intended to limit the scope of the disclosure in any way. For ease of describing and explaining the embodiments of the disclosure, the drawings are not drawn to true scale.

An implementation of the disclosure provides an optical anti-counterfeiting element. The optical anti-counterfeiting element may include: a substrate, including a first surface and a second surface that are opposite to each other; and a surface micro-structure layer, formed on at least a part of the first surface of the substrate. At least part of the surface micro-structure layer may include a first set of a micro-prism. The micro-prism may have refractive and reflective functions simultaneously. Each pixel of a first pattern corresponds to refractive illumination spots of one or more micro-prisms in the first set of the micro-prism, so that: when the optical anti-counterfeiting element is irradiated on a first side of the optical anti-counterfeiting element, the refractive illumination spots of the first set of the micro-prism form the first pattern on a receiving carrier in a plane at a first distance from the second surface; when the optical anti-counterfeiting element is irradiated on a second side of the optical anti-counterfeiting element, the refractive illumination spots of the first set of the micro-prism form the first pattern on a receiving carrier in a plane at a second distance from the first surface; and a virtual image of the first pattern can be observed on the first side and the second side of the optical anti-counterfeiting element, the virtual image is a full parallax image, the first side is a side at which the first surface is located, and the second side is a side at which the second surface is located.

The patterns in the embodiments of the disclosure may be words, letters, numbers, any specific signs, or a combination thereof. A pixel of the first pattern may be a very small point of the first pattern. Each pixel of the first pattern corresponds to the refractive illumination spots of one or more micro-prisms in the first set of the micro-prism. That is to say, through structures of the one or more micro-prisms, incident light can be refracted to a corresponding pixel point on the receiving carrier and forms a light spot. In this way, when the optical anti-counterfeiting element is irradiated on one side of the optical anti-counterfeiting element, a reproduced pattern can be observed by using the receiving carrier at a specific distance of the other side. A position of the receiving carrier configured to observe the reproduced pattern may be determined according to a focal length of the micro-prism. For the first set of the micro-prism forming the first pattern, during irradiation from the first side, each micro-prism can focus light beams on the receiving carrier in the plane at the first distance. During irradiation from the second side, each micro-prism can focus the light beams on the receiving carrier in the plane at the second distance. It may be understood that, if refracted light of the micro-prism can form the reproduced pattern on one side, a same reproduced pattern can be formed on the other side.

An incident light source for irradiating the optical anti-counterfeiting element may be white light (a light source at any visible wavelength band), such as phone flashlight, a D65 standard light source and the like. Alternatively, the incident light source may further be a single-wavelength light source, for example, a blue laser light source with a wavelength of 405 nm. The incident light source may be parallel light, and may vertically enter or obliquely enter (herein, the vertical or oblique incidence is relative to a plane parallel to a surface of the substrate) to the optical anti-counterfeiting element.

In addition, when the optical anti-counterfeiting element is irradiated or is under ambient light, the human eyes can directly observe floating or sunken full parallax images compared with a surface of the optical anti-counterfeiting element, and a relationship between the floating full parallax image and the sunken full parallax image observed on two sides of the optical anti-counterfeiting element is opposite. If the floating full parallax image is observed from the first side, the sunken full parallax image is observed from the second side, and vice versa. A pattern of the full parallax image formed by a set of a prism is consistent with a pattern formed by refracted light of the prism.

In an embodiment, a structure of the micro-prism may be one or more combinations of the following structures: a symmetrical or asymmetrical sawtooth structure, an arcuate structure, a sinusoidal structure or a hyperboloid structure.

In an embodiment, a height (may also be known as a depth) of the micro-prism may be less than 10 microns, specific, less than 5 microns.

In an embodiment, a width of the micro-prism on at least one dimension in a plane parallel to the surface of the substrate is less than 100 microns, specific, less than 40 microns.

In an embodiment, the surface micro-structure layer may be obtained by using micro-nano processing manners such as optical exposure and electron beam exposure, and duplicated in batch by using processing manners such as ultra-violet casting, molding, and nano-imprinting.

In an embodiment, at least part of the substrate may be at least translucent, or at least one side of the substrate is transparent. The substrate may be banknotes, passports, tickets, negotiable securities, and the like.

In some optional implementations, the optical anti-counterfeiting element may further reproduce a second pattern. A reproduced position of the second pattern may be at a distance different from a reproduced position of the first pattern from the optical anti-counterfeiting element. Likewise, the second pattern may also be divided into a plurality of pixels. Each pixel may correspond to refractive illumination spots of one or more micro-prisms in a second set of the micro-prism, so that: when the optical anti-counterfeiting element is irradiated on the first side of the optical anti-counterfeiting element, refracted light of the second set of the micro-prism forms the second pattern on a receiving carrier in a plane at a third distance from the second surface; when the optical anti-counterfeiting element is irradiated on the second side of the optical anti-counterfeiting element, the refracted light of the second set of the micro-prism forms the second pattern on a receiving carrier in a plane at a fourth distance from the first surface; and floating or sunken virtual images of the second pattern can be respectively observed on the first side and the second side of the optical anti-counterfeiting element, and the virtual images are full parallax images. The second pattern may be the same as or different from the first pattern.

In some optional implementations, the optical anti-counterfeiting element may further reproduce same or different patterns at continuously varying positions. Therefore, when the optical anti-counterfeiting element is irradiated on one side, a continuous switching effect or an animation effect of patterns is presented by changing a relative distance between the optical anti-counterfeiting element and the receiving carrier. Specifically, assuming that the continuous switching effect or the animation effect of N patterns is formed, each pattern of the N patterns may be the same or different. The surface micro-structure layer may be consist of N sets of the micro-prism. Each pixel of a reproduced pattern at an ith distance may correspond to refractive illumination spots of one or more micro-prisms of an ith set of N sets of the micro-prism, so that: when the optical anti-counterfeiting element is irradiated on the first side, the refractive illumination spots of the ith set of the N sets of the micro-prism form the ith pattern of the Nth pattern on a receiving carrier in a plane at an ith distance from the second surface; when the optical anti-counterfeiting element is irradiated on the second side, the refractive illumination spots of the jth set of the N sets of the micro-prism form a jth pattern of the Nth pattern on a receiving carrier in a plane at a jth distance from the first surface; and floating or sunken virtual images of the first pattern at different depths (different distances vertical to a plane of the substrate) can be respectively observed on the first side and the second side of the optical anti-counterfeiting element, the virtual images are full parallax images, where N is a positive integer greater than 2, i is a positive integer from 2 to N, and j is a positive integer from 2 to N. N may be set as any proper value according to requirements.

In some optional implementations, the optical anti-counterfeiting element may reproduce a part of a three-dimensional image at continuously varying positions, so as to reproduce the three-dimensional image. For example, the three-dimensional image may be sliced and divided from height. Sliced portions with different heights may be formed by refracted light spots of the refracted light. Assuming that the three-dimensional image may be any three-dimensional image. The three-dimensional image may be divided into N patterns in depth. The surface micro-structure layer may be consist of N sets of the micro-prism. Each pixel of the ith pattern of the three-dimensional image corresponds to refractive illumination spots of one or more micro-prisms of the ith set of N sets of the micro-prism, so that: when the optical anti-counterfeiting element is irradiated on the first side, the refractive illumination spots of the ith set of the N sets of the micro-prism form the ith pattern of the three-dimensional image on a receiving carrier in a plane at the ith distance from the second surface, to cause the receiving carrier having receiving three-dimensional projection information to observe the three-dimensional image; when the optical anti-counterfeiting element is irradiated on the second side, the refractive illumination spots of the ith set of the N sets of the micro-prism form refractive illumination spots of the jth pattern of the three-dimensional image on a receiving carrier in a plane at the jth distance from the first surface, to cause the receiving carrier having the receiving three-dimensional projection information to observe the three-dimensional image; and floating or sunken virtual images of the three-dimensional image can be respectively observed on the first side and the second side of the optical anti-counterfeiting element, the virtual images are full parallax images, where N is a positive integer not less than 2, i is a positive integer from 1 to N, and j is a positive integer from 1 to N. When the receiving carrier (such as space water mist) having the receiving three-dimensional projection information is used, the three-dimensional image of a third pattern can be directly seen in the space of the receiving carrier.

Based on the above any implementation, in some optional implementations, the optical anti-counterfeiting element may further include an adhesive layer covering the surface micro-structure layer. A refractive index difference between the adhesive layer and a material of the micro-prism may be greater than 0.02, preferably, greater than 0.1, and further specific, greater than 0.4. Since the adhesive layer and the material of the micro-prism have different refractive indexes, refraction may occur at an interface between the adhesive layer and the micro-prism. In addition, the adhesive layer may play a role of protecting the micro-prism. It may be understood that, the adhesive layer may not exist, and there may be vacuum or air above a surface of the micro-prism.

The optical anti-counterfeiting element provided in the implementations of the disclosure is further described below with reference to FIG. 1a to FIG. 4.

Figure 1A:
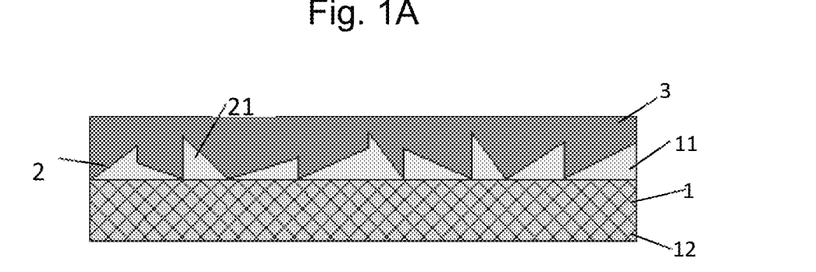
FIG. 1a is a schematic cross-sectional view of an optical anti-counterfeiting element according to an implementation of the disclosure.

FIG. 1a is a schematic cross-sectional view of an optical anti-counterfeiting element according to an implementation of the disclosure. As shown in FIG. 1a, the optical anti-counterfeiting element according to the implementations of the disclosure may include the substrate 1. The substrate 1 has a first surface 11 and a second surface 12 that are opposite to each other. The first surface 11 is covered by the surface micro-structure layer 2. The surface micro-structure layer 2 includes a plurality of micro-prisms 21 having refractive and reflective functions simultaneously. The micro-prisms 21 are covered by the adhesive layer 3. Materials for manufacturing the adhesive layer 3 and the micro-prisms 21 have different refractive indexes.

The micro-prism 21 in FIG. 1a is of an asymmetrical sawtooth structure, and includes a steep surface and an inclined surface. A depth of the steep surface is in a range of 1.5 to 5 microns. An extending width on a plane determined by a normal direction of the inclined surface and a normal direction of the first surface 11 is in a range of 10 to 50 microns. An extending length in a direction perpendicular to the in-plane is not limited. A material forming the micro-prism 21 is a transparent ultraviolet radiation curing coating with a refractive index being 1.60. The adhesive layer 3 covering a surface of the micro-prism is a transparent ultraviolet radiation curing coating with a refractive index being 1.41.

Figure 1B:
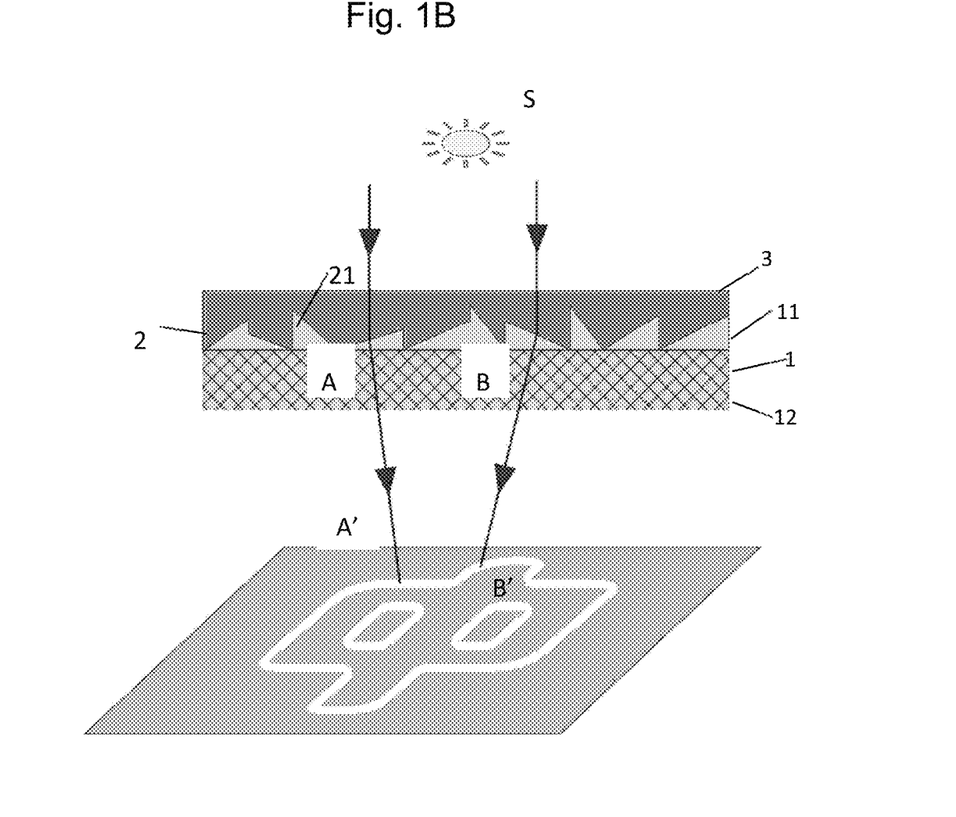

A reproduction process of the surface micro-structure layer in the optical anti-counterfeiting element is explained below with reference to FIG. 1b. In FIG. 1b, when illumination light irradiates the optical anti-counterfeiting element on the side where the first surface 11, a reproduced pattern—a hollow word "中" is presented on the receiving carrier on the side where the second surface 12 at a distance d from the optical anti-counterfeiting element. The illumination of a pixel position A' of the image is from one or more micro-prisms such as the micro-prism A in the surface micro-structure layer 2. The one or more micro-prisms include at least one micro-prism that can refract light emitted by a light source S to A'. Subsets formed by the one or more micro-prisms act as a focusing lens, so that the light emitted by the light source S and partially projected to the first surface 11 is collected at the pixel position A'. Likewise, the illumination of a pixel position B' in the reproduced image is from one or more micro-prisms such as the micro-prism B in the surface micro-structure layer 2. The one or more micro-prisms include at least one micro-prism that can refract the light emitted by the light source S to B'. The subsets formed by the one or more micro-prisms act as the focusing lens, so that the light emitted by the light source S and partially projected to the first surface 11 is collected at the pixel position B'. And so on, at any pixel position in the reproduced pattern (which is the hollow word "中" in this embodiment) on the receiving carrier at the distance d from the second surface 12, equivalent focusing lenses formed by the corresponding one or more micro-prisms can be found in the surface micro-structure layer 2.

Figure 1C:
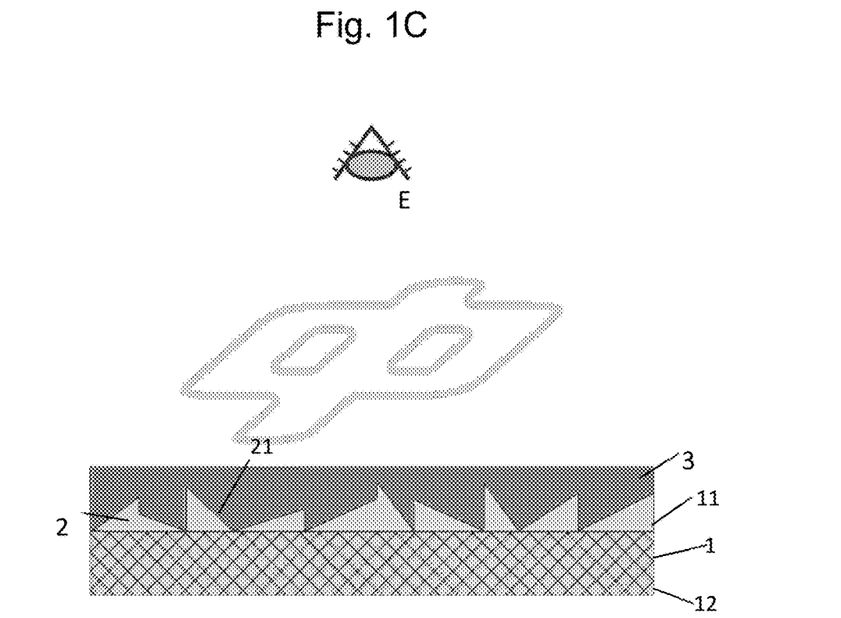

In addition, materials of the adhesive layer 3 and the micro-prism 21 have different refractive indexes, so that reflection occurs at the interface between the adhesive layer 3 and the micro-prism 21. As shown in FIG. 1c, in this embodiment, through the reflection effect, the human eye E on the illumination light side of the first surface 11 sees a floating virtual image—the hollow word "中". This process can be understood in this way. Each position of the floating virtual image is formed by the equivalent focusing lens set corresponding to FIG. 1b under a surface reflection effect. Each position of the floating virtual image may further be described as a bright spot on a surface of the equivalent focusing lens set (that is, each micro-prism may be equivalent to a part of a reflector). The plurality of bright spots form the complete floating virtual image. The virtual image is the full parallax image.

Figure 1D:
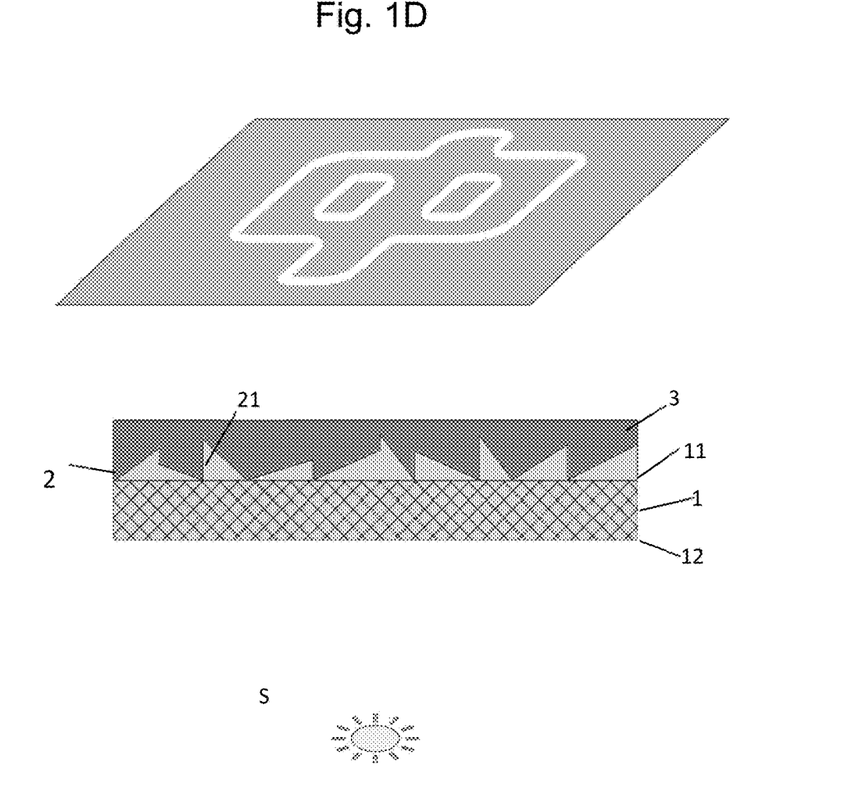

As shown in FIG. 1d, when illumination is performed from the second surface 12 of the substrate 1 of the optical anti-counterfeiting element in this embodiment, the hollow word "中" is reproduced on the receiving carrier on the side where the first surface 11 at the distance d' from the optical anti-counterfeiting element.

Figure 1E:
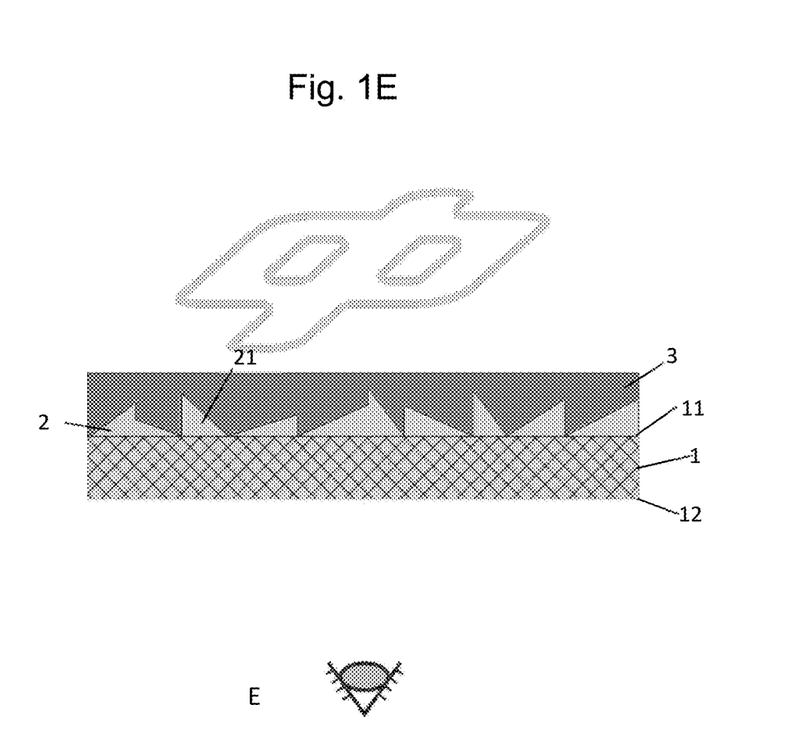

As shown in FIG. 1e, materials of the adhesive layer 3 and the micro-prism 21 have different refractive indexes, so that reflection occurs at the interface between the adhesive layer 3 and the micro-prism 21. In this embodiment, through the reflection effect, the human eye E on the same side of the illumination light side and the second surface 12 sees a sunken virtual image—the hollow word "中". The virtual image is the full parallax image. The virtual image formed by reflected light may be observed without using the illumination light.

Figure 2:
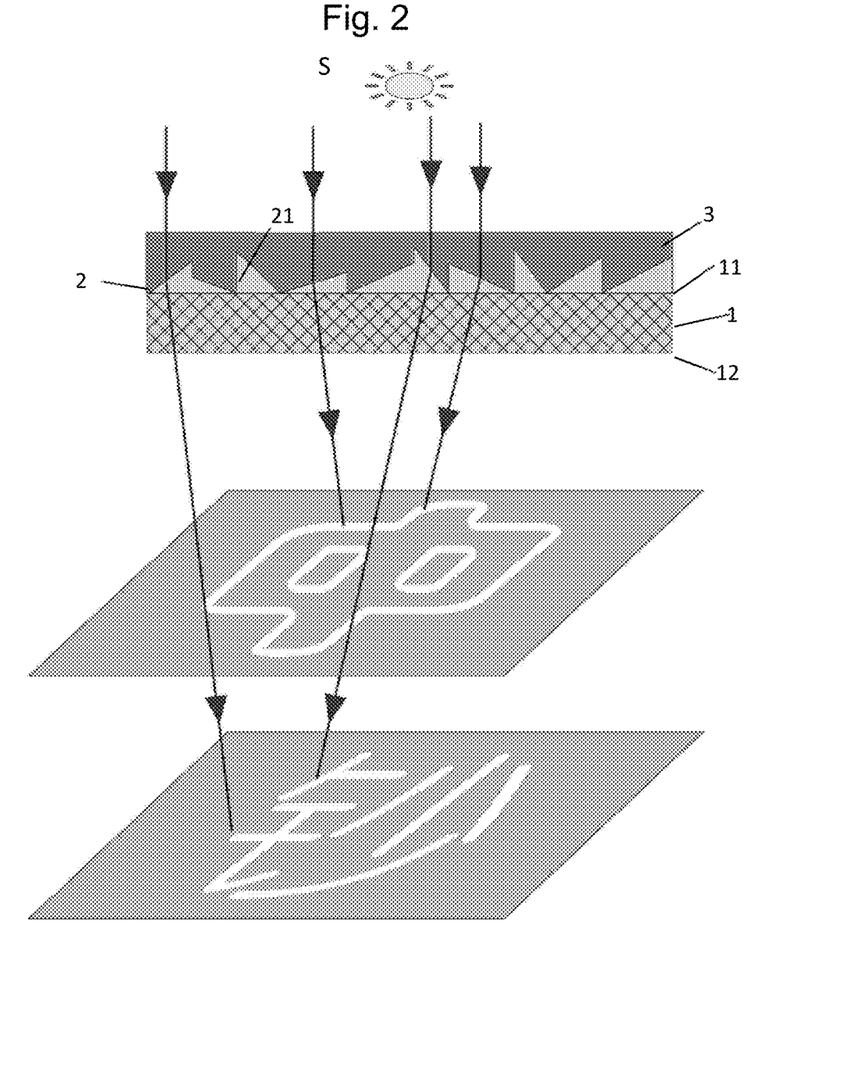
FIG. 2 is a schematic cross-sectional view of an optical anti-counterfeiting element according to another implementation of the disclosure.

In FIG. 2, an optional implementation is further given on the basis of the implementation in FIG. 1a to 1e. Under the illumination of the light source S on the side where the first surface 11, a set of at least part of the micro-prisms in the surface micro-structure layer 2 is defined that a word "钞" is reproduced on the receiving carrier on the side where the second surface 12 at the distance d" from the optical anti-counterfeiting element. The depth d" is different from d. Correspondingly, when the illumination light irradiates from the side where the second surface 12, the word "钞" is reproduced on the receiving carrier on the side where the first surface 11 at a specific distance from the optical anti-counterfeiting element. In addition, under the above cases, the human eye can respectively observe the virtual images of the words "中" and "钞" presented in different depths on the side where the first surface 11 or the side where the second surface 12. That is to say, when the illumination light source S irradiates from the side where the first surface 11, the human eye can directly observe the words "中" and "钞" in different depths on the side where the first surface 11 without using the receiving carrier. When the illumination light source S irradiates from the side where the second surface 12, the human eye can directly observe the words "中" and "钞" in different depths opposite to a depth of focus on the side where the second surface 12 without using the receiving carrier.

Figure 3:
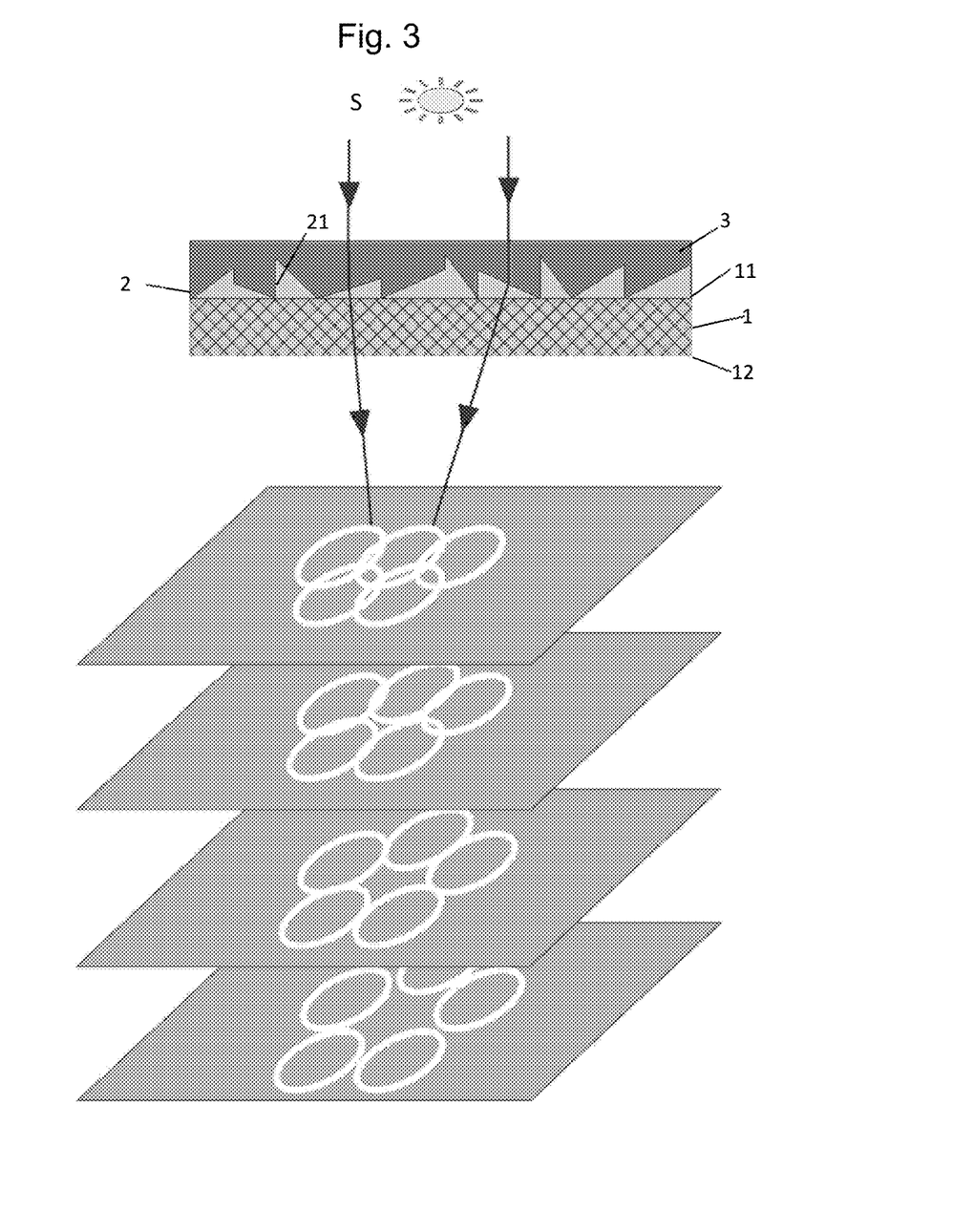
FIG. 3 is a schematic cross-sectional view of an optical anti-counterfeiting element according to still another implementation of the disclosure.

In FIG. 3, an optional implementation is further given on the basis of the implementation in FIG. 1a to 1e. Under the illumination of the light source S on the side where the first surface 11, the micro-prisms in the surface micro-structure layer 2 are further divided into a plurality of sets. Each set corresponds to a specific reproduced pattern on the receiving carrier under different depths, so that patterns (for example, a same pattern, or different patterns) are reproduced at continuously varying positions. In this embodiment, the content of the reproduced pattern is defined as a set of patterns according to the successive increasing of the reproduction depth. The set of images is the same (for example, five-ring patterns shown in FIG. 3). When a relative distance between the optical anti-counterfeiting element and the receiving carrier is changed, a continuous switching effect or an animation effect of the set of images is presented. In this embodiment, the effect is the animation effect. In addition, when the illumination is performed from the side where the second surface 12, the animation effect may be seen on the receiving carrier at different depths on the side where the first surface 11. The virtual images at different depths can be directly and respectively observed by the human eye on two sides. The virtual images are full parallax images.

Figure 4:
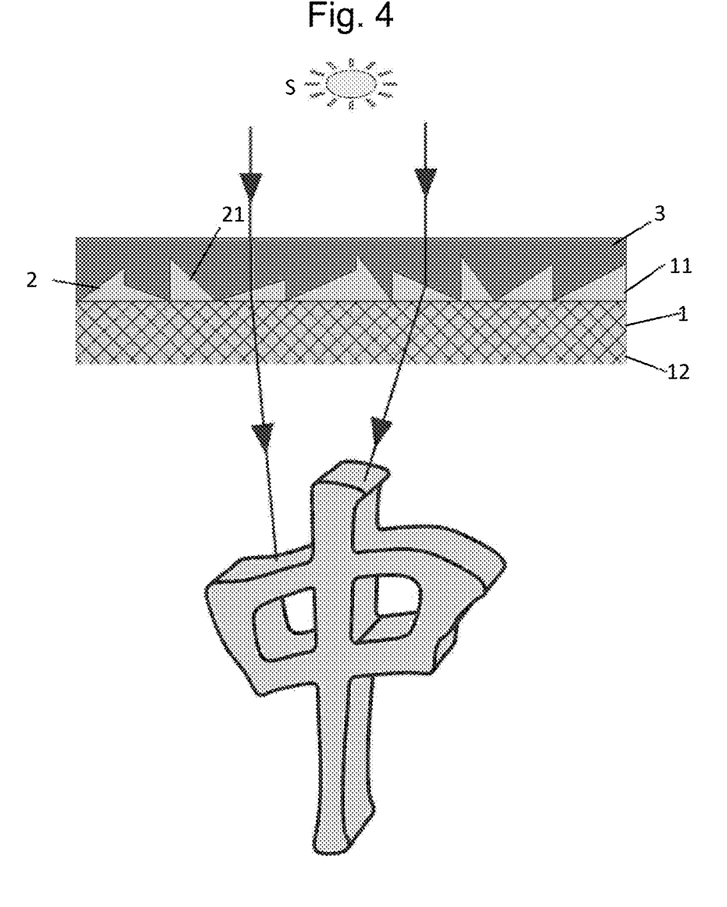
FIG. 4 is a schematic cross-sectional view of an optical anti-counterfeiting element according to yet still another implementation of the disclosure.

FIG. 4 shows a further optional implementation. In an example, the refracted light of the micro-prism may further reproduce a three-dimensional image. A part of the three-dimensional image may be reproduced at continuously varying positions. Under the illumination of the light source S on the side where the first surface 11, the micro-prisms in the surface micro-structure layer 2 are further divided into a plurality of sets. Each set corresponds to slices of the three-dimensional image at different depths. Each slice is equivalent to a pattern. Each pixel of each pattern corresponds to refractive illumination spots of one or more micro-prisms. When the depth of the receiving carrier on the side where the second surface 12 is changed, slice information of the three-dimensional image at different depths can be seen. When the receiving carrier is a receiving carrier such as space water mist having the receiving three-dimensional projection information, the three-dimensional image may be directly seen in the space. In addition, when the illumination is performed from the side where the second surface 12, slices of the three-dimensional image or the three-dimensional image itself may be seen on the receiving carrier on the side where the first surface 11, and the human eye can directly observe the virtual images of the three-dimensional image on two sides without using the receiving carrier. The virtual images are full parallax images.

It may be understood that, a specific example of the optical anti-counterfeiting element provided in the embodiments of the disclosure is not limited to structures shown in FIG. 1a to FIG. 4.

In a further optional implementation of the disclosure, the surface micro-structure layer may be covered by a single or multi-layer coating. The coating may be a single metal coating, a multi-layer metal coating, a coating formed by successively stacking an absorption layer, a low refractive index dielectric layer and a reflective layer, a multi-dielectric layer coating formed by successively stacking a high refractive index dielectric layer, a low refractive index dielectric layer and a high refractive index dielectric layer, and a coating formed by successively stacking an absorption layer, a high refractive index dielectric layer and a reflective layer. A structure of the coating may be called an interference multi-layer structure. The interference multi-layer structure may form a Fabry-Perot resonant cavity, and has a selection effect on incident white light, to cause emitting light to only include certain wave bands, so that a specific color is formed. When an incident angle is changed, an optical distance corresponding to the incident angle is changed, and an interference wave band is also changed, so that the color presented to an observer is changed as well, so as to form a light variation effect. In an implementation according to the disclosure, the high refractive index dielectric layer refers to a dielectric layer of which refractive index is greater than or equal to 1.7, and a material of the high refractive index dielectric layer may be ZnS, TiN, $TiO_2$, TiO, $Ti_2O_3$, $Ti_3O_5$, $Ta_2O_5$, $Nb_2O_5$, $CeO_2$, $Bi_2O_3$, $Cr_2O_3$, $Fe_2O_3$, $HfO_2$, or ZnO and the like. The low refractive index dielectric layer refers to a dielectric layer of which refractive index is less than 1.7, and a material of the low refractive index dielectric layer may be MgF2, SiO2 or the like. A material of the reflective layer may be a metal such as Al, Cu, Ni, Cr, Ag, Fe, Sn, Au, and Pt or a mixture thereof and an alloy. A material of the absorption layer may be a metal such as Al, Cr, Ni, Cu, Co, Ti, V, W, Sn, Si, and Ge or a mixture thereof and an alloy.

Physical and/or chemical deposition methods may be used to form the coating. For example, the methods include, but are not limited to, thermal evaporation, magnetron sputtering, MOCVD, molecular beam epitaxy and the like. In an embodiment, the coating may be form on the surface relief structure layer in the form of isomorphic covering. In an embodiment, at least one layer of the coating is patterned and hollowed out.

In a further optional implementation of the disclosure, a diffractive holographic micro-structure or a non-diffractive surface micro-structure is added in the surface micro-structure layer.

In a further optional implementation of the disclosure, the optical anti-counterfeiting element may be added with the following one or more of a conductive layer, a magnetic layer, or a layer composed of a material having an infrared characteristic, an ultraviolet characteristic or a polarization characteristic, which is equivalent to the corresponding addition of conductive anti-counterfeiting characteristics, magnetic machine-readable anti-counterfeiting characteristics, infrared characteristics, ultraviolet characteristics or polarization characteristics.

The optical anti-counterfeiting element according to the implementations of the disclosure is applicable to various anti-counterfeiting products or tickets, and especially applicable to the manufacturing of windowed safety lines, labels, identifiers, wide strips, transparent windows, mulching films and the like. A thickness of the safety line is not greater than 50 μm. An anti-counterfeiting paper provided with the anti-counterfeiting element is applicable to the anti-counterfeiting of various high-safety products such as banknotes, passports, tickets, and negotiable securities.

Another aspect of the disclosure provides an optical anti-counterfeiting product having the optical anti-counterfeiting element described in any implementation of the disclosure. The product includes, but is not limited to, a high-safety product and a high-value-added product such as a banknote, a credit card, a passport, and a negotiable security, as well as various wrapping papers and wrapping boxes.

The optional implementations of the embodiments of the disclosure are described in detail above with reference to the drawings. However, the embodiments the disclosure are not limited to the specific details in the above implementations, and within the scope of the technical concept of the embodiments of the disclosure, various simple modifications can be made to the technical solutions of the embodiments of the disclosure, and these simple modifications all fall within the protection scope of the embodiments of the disclosure.

In addition, it is to be noted that, each specific technical feature described in the above specific implementations can be combined in any suitable manner without contradiction. In order to avoid unnecessary repetition, various possible combinations are not described separately in the embodiments of the disclosure.

In addition, the various implementations of the embodiments of the disclosure can also be combined arbitrarily, as long as without departing from the spirit of the embodiments of the disclosure, and should also be regarded as the contents disclosed in the embodiments of the disclosure.

What is claimed is:

1. An optical anti-counterfeiting element, comprising:
a substrate, comprising a first surface and a second surface that are opposite to each other;
a surface micro-structure layer, formed an at least a part of the first surface of the substrate, wherein at least part of the surface micro-structure layer comprises a first set of a micro-prism, the micro-prism has refractive and reflective functions simultaneously,
each pixel of a first pattern corresponds to refractive illumination spots of one or more micro-prisms in the first set of the micro-prism, so that:
when the optical anti-counterfeiting element is irradiated on a first side of the optical anti-counterfeiting element, the refractive illumination spots of the first set of the micro-prism form the first pattern on a receiving carrier in a plane at a first distance from the second surface;
when the optical anti-counterfeiting element is irradiated on a second side of the optical anti-counterfeiting element, the refractive illumination spots of the first set of the micro-prism form the first pattern on a receiving carrier in a plane at a second distance from the first surface; and a virtual image of the first pattern is observed on the first side and the second side of the optical anti-counterfeiting element, and the first side is a side at which the first surface is located, and the second side is a side at which the second surface is located the range of a height of the micro-prism is less than 5 microns and greater than 1.5 microns, wherein at least part of the surface micro-structure laver comprises N sets of the micro-prism, and each pixel of an ith pattern of N patterns corresponds to refractive illumination spots of an ith set of the N sets, so that:

when the optical anti-counterfeiting element is irradiated on the first side, the refractive illumination spots of the ith set of the N sets of the micro-prism form the ith pattern on a receiving carrier in a plane at an ith distance from the second surface;

when the optical anti-counterfeiting element is irradiated on the second side, the refractive illumination spots of a jth set of the N sets of the micro-prism form a ith pattern on a receiving carrier in a plane at a ith distance from the first surface; and virtual images of the N patterns at different depths are respectively observed on the first side and the second side of the optical anti-counterfeiting element, wherein N is a positive integer greater than 2, i is a positive integer from 1 to N, j is a positive integer from 1 to N, and each pattern of the N patterns is same or different; or at least part of the surface micro-structure laver further comprises at least a second set of the micro-prism and each pixel of a second pattern corresponds to refractive illumination spots of one or more micro-prisms in the second set of the micro-prism, so that, when the optical anti-counterfeiting element is irradiated on the first side of the optical anti-counterfeiting element, the refractive illumination sots of the second set of the micro-prism form the second pattern on a receiving carrier in a plane at a third distance from the second surface; and when the optical anti-counterfeiting element is irradiated on the second side of the optical anti-counterfeiting element, the refractive illumination spots of the second set of the micro-prism form the second pattern on a receiving carrier in a plane at a fourth distance from the first surface; and a virtual image of the second pattern is observed on the first side and the second side of the optical anti-counterfeiting element, and the first pattern is the same or different from the second pattern;

or the first pattern is a pattern into which a three-dimensional image is divided, the three-dimensional image is divided into N patterns, at least part of the surface micro-structure laver comprises N sets of the micro-prism, and each pixel of an ith pattern of the N patterns corresponds to refractive illumination spots of one or more micro-prisms of an ith set of N sets of the micro-prism, so that:

when the optical anti-counterfeiting element is irradiated on the first side, the refractive illumination spots of the ith set of the N sets of the micro-prism form the ith pattern of the three-dimensional image on a receiving carrier in a plane at an ith distance from the second surface, to cause the receiving carrier having receiving three-dimensional projection information to observe a three-dimensional image of a third pattern;

when the optical anti-counterfeiting element is irradiated on the second side, the refractive illumination spots of the ith set of the N sets of the micro-prism form a ith pattern of the three-dimensional image on a receiving carrier in a plane at a ith distance from the first surface, to cause the receiving carrier having the receiving three-dimensional projection information to observe the three-dimensional image of the third pattern; and a virtual image of the three-dimensional image is observed on the first side and the second side of the optical anti-counterfeiting element, wherein N is a positive integer not less than 2, i is a positive integer from 1 to N, and j is a positive integer from 1 to N.

2. The optical anti-counterfeiting element according to claim 1, wherein a structure of the micro-prism is one or more combinations of the following structures: a symmetrical or asymmetrical sawtooth structure, an arcuate structure, a sinusoidal structure or a hyperboloid structure.

3. The optical anti-counterfeiting element according to claim 1, wherein
a width of the micro-prism on at least one dimension in a plane parallel to the first surface is less than 100 microns.

4. The optical anti-counterfeiting element according to claim 3, wherein
a width of the micro-prism on at least one dimension in a plane parallel to the first surface is less than 40 microns.

5. The optical anti-counterfeiting element according to claim 1, further comprising:
an adhesive layer covering the surface micro-structure layer, wherein a refractive index difference between the adhesive layer and a material of the micro-prism is greater than 0.1.

6. The optical anti-counterfeiting element according to claim 5, wherein a refractive index difference between the adhesive layer and a material of the micro-prism is greater than 0.1.

7. The optical anti-counterfeiting element according to claim 6, wherein a refractive index difference between the adhesive layer and a material of the micro-prism is greater than 0.4.

8. The optical anti-counterfeiting element according to claim 1, further comprising:
a single or multi-layer coating covering the surface micro-structure layer; and/the following one or more of a conductive layer, a magnetic layer, or a layer composed of a material having an infrared characteristic, an ultraviolet characteristic or a polarization characteristic.

9. The optical anti-counterfeiting element according to claim 1, wherein the surface micro-structure layer further comprises a diffractive holographic micro-structure or a non-diffractive surface micro-structure.

10. The optical anti-counterfeiting element according to claim 1, wherein the first pattern is a word, a letter, a number, a specific sign, or a combination thereof.

11. An anti-counterfeiting product, having the optical anti-counterfeiting element according to claim 1.

12. The anti-counterfeiting product according to claim 11, wherein a structure of the micro-prism is one or more combinations of the following structures: a symmetrical or asymmetrical sawtooth structure, an arcuate structure, a sinusoidal structure or a hyperboloid structure.

13. The anti-counterfeiting product according to claim 11, further comprising:
a single or multi-layer coating covering the surface micro-structure layer; and/the following one or more of a conductive layer, a magnetic layer, or a layer composed of a material having an infrared characteristic, an ultraviolet characteristic or a polarization characteristic.

14. The anti-counterfeiting product according to claim 11, wherein the surface micro-structure layer further comprises a diffractive holographic micro-structure or a non-diffractive surface micro-structure.

* * * * *